United States Patent [19]

McCullough, Jr. et al.

[11] Patent Number: 4,643,931

[45] Date of Patent: Feb. 17, 1987

[54] METHOD AND MATERIALS FOR MANUFACTURE OF ANTI-STATIC CARPET HAVING TUFTS CONTAINING ELECTROCONDUCTIVE CARBONIZED FILAMENTS OR FIBERS

[75] Inventors: Francis P. McCullough, Jr., Lake Jackson, Tex.; David M. Hall, Auburn, Ala.

[73] Assignee: The Dow Chemical Company, Midland, Mich.

[21] Appl. No.: 773,961

[22] Filed: Sep. 9, 1985

[51] Int. Cl.[4] .................................................. B32B 3/02

[52] U.S. Cl. .......................................... 428/97; 156/72; 428/367

[58] Field of Search ..................... 428/97, 367; 156/72

[56] References Cited

U.S. PATENT DOCUMENTS 4,285,831 8/1981 Yoshida et al. .................... 428/367

*Primary Examiner*—Marion C. McCamish

*Attorney, Agent, or Firm*—Glwynn R. Baker

[57] ABSTRACT

An electroconductive tow or yarn, made from continuous filaments or staple fibers, respectively, prepared from stabilized petroleum pitch, coal tar pitch or polyacrylonitrile is preferably knit and heat treated to a carbonizing temperature and thereafter deknitted, chopped into appropriate length and blended with the standard carpet fibers or yarn at any one of several steps in the yarn making process to produce a yarn having static dissipation properties.

5 Claims, No Drawings

METHOD AND MATERIALS FOR MANUFACTURE OF ANTI-STATIC CARPET HAVING TUFTS CONTAINING ELECTROCONDUCTIVE CARBONIZED FILAMENTS OR FIBERS

BACKGROUND OF THE INVENTION

Carpeting is manufactured from yarns or tows produced from natural or synthetic staple fibers or continuous synthetic filaments, respectively. The fibers are delivered to a yarn spinning plant in bales while the filament is shipped on cones. The yarn maker generally blends all of the bales of staple fiber of a particular lot, through an opening process which consist of mixing portions of each bale in a lot in one or more opening operations and combining the output of these operations, thus, insuring more uniform yarn properties, such as dye acceptance. In some instances the fibers are blended twice, or cross blended as this practice is referred to in the trade. Depending upon the ultimate use of the yarn, various treatments may be undertaken during blending, such as tinting for lot identification and/or application of lubricants and the like. The blended fibers are carded to form a web which is collected as a card sliver. This rope-like card sliver is fed to the first pin drafter therein to produce a sliver, an operation tending to further parallel the individual fibers in the resulting sliver. It is customary for the sliver to be pin-drafted several more times so that the yarn (referred to as singles) subsequently produced will be of the desired weight and, of course, obtain uniformity through further paralleling of the fibers.

The yarn may also consist of an assembly of any number of continuous mono-filaments of varying deniers which are combined and twisted to give continuous multi-filament yarn singles.

Normally these single yarns are plyed, two ply being the most common, by twisting the singles in a reverse direction to the singles twist, a process referred to as cabling. In most modern day carpet mills the yarns are "tufted" through a jute, polypropylene or other woven or non-woven scrim or primary backing on tufting machines which may be and usually are computerized to enable numerous designs both as to length of the loop, type of loop, number of loops per inch, etc. to be made. This assembly can be, and usually is, dyed in one of the numerous batch or continuous dye machines commonly in use today. The so tufted carpet may have the loops pre-cut, if a cut loop pile is desired, and an adhesive, such as latex, urethane or the like, applied and cured onto the back of the carpet to anchor the tufts to the primary backing and then trimmed to the desired width either at this point or before the latex is applied. To provide stability and weight to the carpet, a secondary backing of jute, polypropylene, or the like, may be attached at this time.

Recently several of the mills have begun to blend or have blended a small amount of a conductive fiber into the yarn to act as a static dissipation element. It is becoming conventional for the fiber manufacturer to add a wad of individual fibers to the bales. Such fibers are composites made conductive by incorporating into a hollow fiber a core of carbon (graphite) or by coating a fiber with a sheath made of a composite containing carbon (graphite) among other methods. These electroconductive fibers are blended with the polymer fibers at the staple cutting stage. However in some instances these composite fibers after being made into staples are added to the synthetic staple fibers at the opening stage. In most instances while electrostatic charges are dissipated to some degree when either of the aforedescribed electroconductive fiber (sheath coated or hollow fiber filled with carbon (graphite)) composites is employed, only modest results are achieved.

It would therefore be advantageous for the carpet manufacturer to have a better conductor and a more readily incorporable technique for placing the conductive fiber (carbon or graphite) into the yarn to obtain a more uniform distribution and greater assurance that the contact with a substantial number of tufts, loop or pile of the carpet assembly are made to carry the static charge away from the source, i.e., distribute the charge over a large area of the carpet.

BRIEF DESCRIPTION OF THE INVENTION

In accordance with the present invention an electroconductive two or yarn, made from continuous filaments or staple fibers, respectively, prepared from stabilized petroleum pitch, coal tar pitch or polyacrylonitrile is preferrably knit and heat treated to a carbonizing temperature and thereafter deknitted, chopped into appropriate length and blended with the standard carpet fibers or yarn at any one of several steps in the yarn making process to produce a yarn having static dissipation properties.

The preferred point at which the carbonaceous material is introduced into staple yarn making processes is at the blenders because there will be obtained a more uniform blending and distribution throughout the ultimate yarn. It is of course to be understood that the carbonaceous material can be added in sliver form at the pin drafters or as a staple fiber at the cards, or as a continuous yarn tow during twisting or cabling. Alternatively, a tow or yarn of or containing the carbonaceous filaments is heat-set in conventional crimp stabilizing apparatus, carbonized and either cut into staple or fed as a continuous filament to the continuous filament twisting or cabling stages, combining with the conventional filaments to produce a yarn or tow having static dissipation properties.

The carbonaceous material useful in accordance with the present invention is more fully disclosed in U.S. patent application Ser. No. 558,239, entitled Energy Storage Device, filed Dec. 5, 1983, and Ser. No. 678,186, entitled Secondary Electrical Energy Storage Device and Electrode Therefor, filed Dec. 4, 1984, each by Francis P. McCullough and Alvin F. Beale, which is incorporated in toto herein, which when modified in accordance with U.S. patent application Ser. No. 724,440 entitled Novel Fabric and Fiber, filed Apr. 18, 1985 by Francis P. McCullough and David M. Hall serves as a preferred embodiment of the carbonaceous material suitable for use in accordance with the present invention.

DETAILED DESCRIPTION OF THE INVENTION

In accordance with one embodiment of the present invention the fibers from bales of an undyed lot of nylon or other suitable synthetic fiber, the fibers of which are approximately seven inches long, are introduced into the opening (blending) process by alternately feeding to several blenders a small portion of the fibers from each bale along with a small amount of the fibers of the carbonaceous material (preferrably derived from knitting, carbonizing, deknitting and cutting to similar staple length (−7″) a stabilized filament prepared from a petroleum pitch, coal-tar pitch or polyacrylonitrile spun filament). The ratio of synthetic fibers to carbonaceous material is generally greater than about 100 to 200 times the amount of undyed fibers from the lot to the carbonaceous staple crimped material, on a weight basis. The resulting fibrous mats are rebaled and thereafter blended again feeding a small amount from each bale almost simultaneously to the blenders. Following opening or blending, the fibers are carded. The output of several cards are fed to a conventional pin drafting and spinning operation and usually two of these yarns are ply twisted together in a reverse direction to the single's yarn twist to form a two ply yarn. Such two ply yarns are subsequently tufted into a primary backing (scrim) in the carpet manufacturing process. This product is dyed, trimmed and backed.

In a representative operation the carbonized, deknitted, cut carbonaceous fiber was blended with several bales from a lot of fiber and the resulting blanket carded and pin drafted. This sliver was combined, at the pin drafters, first, second or third, depending on the ratio of carbonaceous fiber to synthetic fiber desired, e.g. with 100 to 200 times its weight of additional slivers containing no carbonaceous material prepared as aforedescribed, at the pin drafters. There is thus obtained a sliver which has the carbonaceous fibers distributed throughout but introduced at a different point in the staple yarn making (spinning) process. Alternatively, the yarn may consist of an assembly of a number of continuous monofilaments of varying deniers which are combined with filaments or staple yarns of the carbonaceous material such as prepared above, to give a multi-filament yarn suitable for use in the continuous tufted carpets.

The yarns of the present invention, prepared as aforedescribed were and are "tufted" through a jute, polypropylene or other woven or non-woven scrim or primary backing on tufting machines which are preferably computerized to enable numerous designs both as to length of the loop, type of loop, number of loops per inch, etc. to be made. The tufted assemblies were and are dyed in any one of the numerous batch or continuous dye machines commonly in use today and thereafter trimmed, the loops pre-cut, if required, and an adhesive, such as latex, urethane or the like, applied and cured onto the back of the carpet to anchor the tufts to the primary backing. A secondary backing of jute, polypropylene, or the like, may be attached at this time. Such additional backing adds weight and stability to the finished carpet.

EXAMPLE 1

The following example illustrates one embodiment of the present invention.

Monsanto 1879 nylon (trilobal) fiber was blended with 0.5% by weight of a conductive fiber which had been prepared by heating an oxidatively stabilized polyacrylonitrile multi-filament tow which had been knitted into a fabric, heat-set at about 1500° C., de-knitted and cut into staple approximately 7 inches in length. The blended fibers were carded and the resulting sliver was pin drafted three times, recombination ratios were 10:1, 3:1, and 5:1, respectively. The resulting drafted sliver was spun into a single ply yarn with an average twist of about 4.75 and the single yarn was plied with a nylon yarn made in the same fashion but containing no carbonaceous fiber. The 3.00/2 ply yarn which was heat set on a Suessen heat setting apparatus was thereafter tufted into a ⅛ gauge, 27 oz., ⅜ in. pile height carpet (a cut loop form) with approximately 8 stitches per inch. The ratio of carbonaceous fiber to yarn containing no carbonaceous fiber in the tufting operation was 1:5, respectively. A portion of the carpet was backed with a commercial non-conductive latex carpet backing. The resulting carpet was tested for static discharge properties by charging the carpet to 5000 volts while in an atmosphere having a relative humidity of less than 20%. The static charge was dissipated to 0% of original charge in less than one second, and some of the samples discharged in less than ½ second. The standard for the industry is a discharge to 0% in 2 seconds or less.

EXAMPLE 2

In another example 100 grams of the same precursor acrylonitrile tow as described in example 1 was used but it had been heat set after knitting to only 950° C. All other aspects of the carbonaceous material were the same. The carbonaceous containing singles was blended with 100 pounds of the Monsanto 1879 nylon as in Example 1. The resulting yarn contained 0.02 percent carbonaceous material substantially evenly distributed throughout the yarn. The yarn was tufted to prepare a carpet in a manner similar to Example 1. Thus, each tufted carpet end has the carbonaceous material. Results were similar to the results obtained in Example 1.

What is claimed is:

1. A carpet having static discharge properties to 0% of original charge in less than about 1 second comprised of:

a yarn tufted into a scrim, said yarn consisting of at least a single ply of a yarn prepared by incorporating an amount from 0.25 to 0.5 weight percent of a carbonaceous material (a) as a staple fiber into staple yarns or (b) twisting and/or cabling continuous filaments into a continuous filament yarn, said carbonaceous material of (a) and (b) derived from a stabilized coil-like heat set, 950°–1500° C. carbonized polyacrolynitrile, petroleum pitch or coal-tar pitch spun staple fibers or filaments, respectively distributed among the conventional staple fiber yarns or continuous filament yarns, respectively, during the carpet yarn conventional spinning process.

2. A carpet having static discharge properties to 0% of original charge in less than about 1 second comprised of:

a yarn tufted into a scrim, said yarn consisting of at least a single ply of a yarn prepared by pin drafting a sliver containing from 0.25 to 0.5 weight percent of a carbonaceous fiber or filaments derived from a stabilized heat set carbonized polyacrolynitrile or petroleum or coal tar spun fibers, which has been crimped by knitting, heat setting, carbonizing and de-knitting or crimped in the standard heat-set crimp method, carbonizing and spun into a singles yarn in conventional manner.

3. A yarn or tow having static discharge properties to 0% of original charge in less than about 1 second comprised:

of at least a single ply of a yarn prepared by pin drafting a sliver containing from 0.25 to 0.5 weight percent of a carbonaceous fiber or filaments derived from a stabilized heat set carbonized polyacrolynitrile or petroleum or coal tar spun fibers, which has been crimped by knitting, heat setting, carbonizing and de-knitting or crimped in the standard heat-set crimp method then carbonized and spun into a singles yarn in conventional manner.

4. A yarn or tow having static discharge properties to 0% of original charge in less than about 1 second comprised:

of at least a single's ply of a mixture of natural or synthetic fibers combined with a ply containing from 0.25 to 0.5 weight percent of a carbonaceous fiber or filaments derived from a stabilized heat set carbonized polyacrylonitrile or petroleum or coal tar spun fibers, which has been crimped by knitting, heat setting, carbonizing and de-knitting or crimped in the standard heat-set crimp method, then carbonized and spun into a singles yarn in conventional manner.

5. In the manufacture of a carpet having anti-static properties wherein a yarn is tufted into a scrim, said yarn having a carbonaceous material distributed throughout the yarn, the improvement consisting of, tufting a yarn conventional yarn having at least a singles containing from about 0.25 to about 0.5 weight percent of an electroconductive material selected from the group consisting of a stabilized, coil-like heat set, 950°-1500° C. carbonized carbonaceous material selected from the group consisting of filaments and/or staple fibers of polyacrylonitrile, petroleum pitch or coal tar pitch precursors.

* * * * *

UNITED STATES PATENT AND TRADEMARK OFFICE
CERTIFICATE OF CORRECTION

PATENT NO. : 4,643,931

DATED : February 17, 1987

INVENTOR(S) : Francis P. McCullough, Jr. and David M. Hall

It is certified that error appears in the above-identified patent and that said Letters Patent is hereby corrected as shown below:

Column 2, line 21, "two" should read --tow--.
Column 3, lines 27-28, "aforedescribed" should read --afore-described--.
Column 4, line 42, "polyacrolynitrile" should read --polyacrylonitrile--.
Column 4, line 56, "polyacrolynitrile" should read --polyacrylonitrile--.
Column 4, line 68, "polyacrolynitrile" should read --polyacrylonitrile--.

Signed and Sealed this

Nineteenth Day of April, 1988

*Attest:*

DONALD J. QUIGG

*Attesting Officer*

*Commissioner of Patents and Trademarks*